Feb. 4, 1930.  W. L. KRAEMER ET AL  1,745,426
APPARATUS FOR PRODUCING FILTER MEMBERS
Filed June 10, 1927
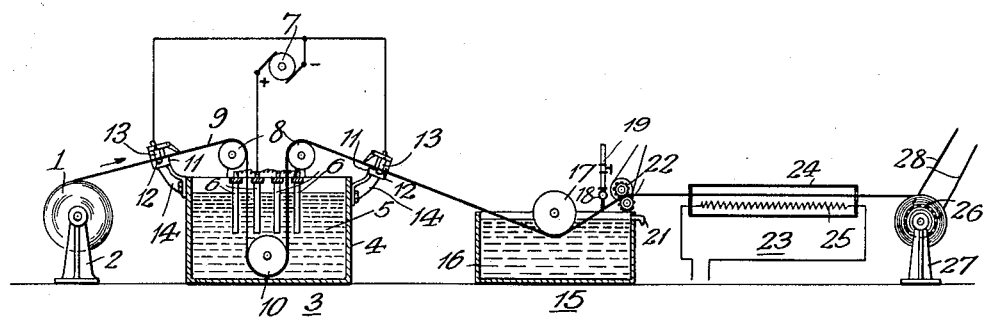
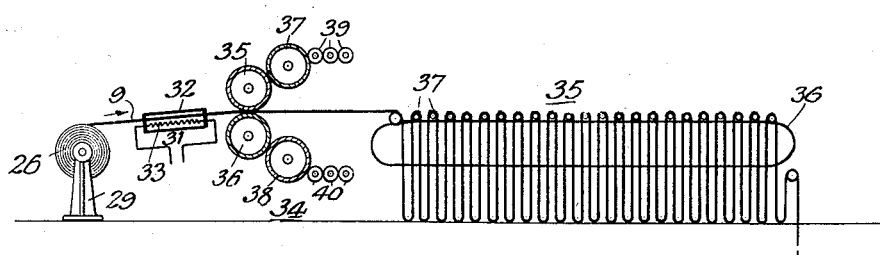
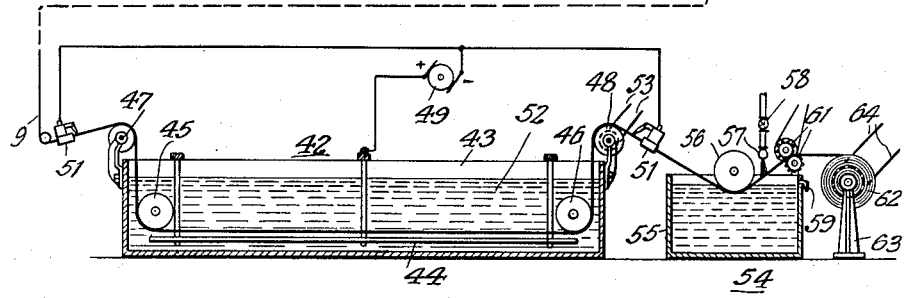
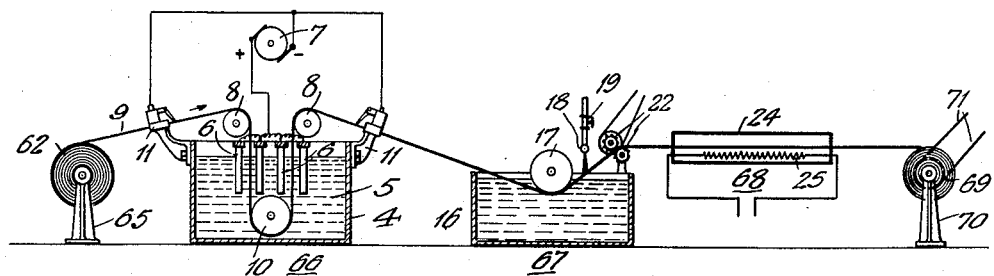
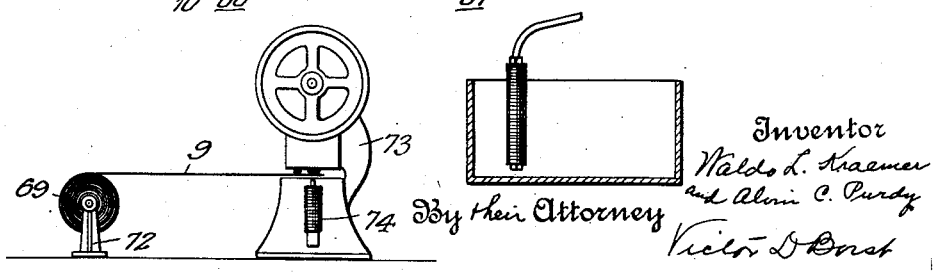

Patented Feb. 4, 1930

1,745,426

UNITED STATES PATENT OFFICE

WALDO L. KRAEMER, OF BROOKLYN, AND ALVIN C. PURDY, OF MIDDLETOWN, NEW YORK, ASSIGNORS TO METAL EDGE FILTER CORPORATION, A CORPORATION OF NEW JERSEY

APPARATUS FOR PRODUCING FILTER MEMBERS

Application filed June 10, 1927. Serial No. 197,783.

Our invention relates to apparatus for the production of edge filter devices and particularly to the production of the thin metal washers having spacing projections thereon, which comprise the essential filter elements.

We have found that a filter having unusual advantages and properties can be obtained from a construction in which a number of thin metal washers, each having spacing projections on one of the surfaces, are stacked upon a spindle, squeezed together by suitable compression means and the fluid to be filtered forced through the interstices between the metal washers formed by the projection. The impurities are left behind against the edges of the washers comprising the filter spindle and only a clear fluid passes through. The spacing between the washers is desirably made small, but particles smaller than the spacing between the discs appear to be held back by the filter action. The finished filter of our invention is disclosed in the copending application, Serial #719,695 filed June 13, 1924. Because of the fact that a considerable number of the filter discs are required to produce one spindle, and several spindles are required to produce a filter of the desired capacity, the production of the large number of discs required is a matter of some difficulty and involves several problems which have been satisfactorily solved only by the application of principles in new and unexpected ways. It has been found commercially impractical to prepare the washers by depositing the spacing projections upon them one at a time after punching them out, and difficulty has been encountered in the proper production of the desired spacing projections, at a reasonably rapid rate of speed.

In practicing our invention, utilizing the new, useful and unexpected features developed in the system of our production, we proceed according to the following sequence of steps:

We find that a desirable material for the discs of our filter device is found to be thin sheet brass, which may conveniently have a thickness of about two and one-half thousandths of an inch (0.0025"). We obtain this material in the form of strips desirably about six inches wide in rolls of a size desirably weighing from seventy-five to one hundred pounds. The material is desirably obtained in a rather hard form, substantially similar to that of cold rolled, hard, spring brass, since if it is soft it dents and creases with undue ease. The material is then cleaned, dried, and a non-conducting ink film is applied to the surface with openings in the ink film at the point where the spacing projections are to occur, the ink is dried, the spacing projections electrically deposited in the openings through the ink film, the film is removed, the plated strip dried, and the washers formed by a suitable punch press device.

By this means we are enabled to produce the desired washers in thin metal with integral spacing projections, by a very simple production process, which is speedy and inexpensive, and which produces a thoroughly satisfactory filter washer.

Other objects and structural details of our invention will be apparent from the following description when read in connection with the accompanying drawings, wherein:

The single figure is a diagrammatical representation of the apparatus embodying a preferred form of invention and indicating the sequence of steps therein.

Referring to the figure, the roll of thin sheet metal 1 is desirably positioned upon a reel standard 2, from which it is easily unwound. The reel may be attached firmly to the spindle, and a friction brake may be provided, if desired, to prevent too rapid unrolling of the reel, depending upon the springiness of the metal and the set given it in the reeling. From the standard 2, the strip of metal is led to a cathodic cleaning bath 3.

The bath 3 may consist of a suitable vat or tub 4 preferably lined with suitable material for making it fluid tight. The vat 4 contains an electrolyte 5, which is desirably composed of a solution of sodium carbonate in water, or may be other suitable cathodic cleaning fluid, such as sodium hydroxide solution or other material. Anodes 6 are provided, submerged within the electrolyte 5. These anodes desirably comprise sheets or slabs of carbon, which may be graphite, or may be any other suitable form of carbon. The slabs of carbon are made anode by connection to the positive terminal of the generator 7, which is of the pattern adapted to produce a high current at a low voltage. Guide rolls 8 are positioned above the surface of the electrolyte 5 for the guidance and conveyance of the strip of sheet metal 9 from the reel 1. A third guide roll 10 is positioned submerged within the electrolyte 5 near the bottom of the vat 4. The strip of metal 9 is led over the first of the rolls 8, downward into the electrolyte 5, under the roll 10, upward through the electrolyte to the second of the rolls 8, and thereafter away from the cleaning vat. The anodes 6 are positioned, as shown, in pairs upon opposite sides of the respectively upwardly and downwardly directed portions of the strip 9, thereby placing the anodes conveniently close to the strip to be cleaned, and thereby reducing the voltage drop, and therefore the power loss from the current through the solution.

Connection is made from the negative terminal of the generator 7 to the strip 9 by suitable connector devices which may desirably comprise a sole plate portion 11 with upwardly extending side members 12 in which may be positioned guide rolls 13 and to which may also be attached drag links for increasing the pressure upon the strip 9. The connector members are desirably supported upon brackets 14, which may be attached to the vat 4, or may be attached to any other suitable supporting means, but are insulated from the electrolyte 5.

Actuation of the generator 7, thus passes a current through the electrolyte between the anodes and the strip 9 as cathode. Hydrogen is thus liberated at the strip surface and the well known cathodic cleaning action occurs, for the removal of rolling mill grease and such other dirt or impurities as may have been collected by the strip in the course of manufacture and shipment.

The strip 9 is then led from the second of the contact connectors 12 to a rinser 15.

The rinser 15 may desirably comprise a vat 16 having a roller 17 positioned therein, with at least the lower portion submerged in the water in the tank and under which the strip 9 is traversed. A spray device 18 is provided, positioned over the strip 9 and connected through a pipe and valve 19 to a supply of clear water, not shown, for rinsing the strip 9. An over-flow 21 is likewise provided and led to a drain. A pair of wringer rolls 22 are provided and the strip 9 is led between the rolls for the removal of excess water, so that the strip 9 is delivered from the rinsing tank with only a thin film of water thereon. The rolls 22 are geared together and driven by a convenient source of power, to draw the strip 9 through the baths, loading springs being provided to cause them to grip the strip. By the traverse through the rinser 15, the small quantities of soda solution from the cleaning device 3 are removed, together with any loosened but not separated dirt. This strip is thus delivered from the washer 15 free from all impurities except a thin film of clear water. From the washer 15 the strip 9 is led into a drier 23, which may desirably be a cabinet 24 with suitable heating means 25 therein. The heater may desirably consist of an electrical resistor, or it may equally well consist of pipe containing steam under pressure, or it may consist of suitable flues heated by direct flame, although these are much less desirable.

After being dried the strip is ready for the next step in the process, which is the application of the ink film. The strip 9 may be led directly from the drier 23 to the printing press, if the printing press is adapted to run at the same speed as is found desirable for the cleaning process. Alternatively, the strip 9 may be re-reeled upon a reel 26, supported upon a stand 27 and operated by power through a suitable power transfer means, which may be a belt 28. Any suitable type of reeling device may be used which does not exert too much tension upon the strip being traversed, but which exerts sufficient traction to move the strip at a suitable rate of speed. If the clean strip is re-reeled, it is conveniently transferred from the reel stand 27 either to temporary storage or to another reel stand 29, conveniently positioned with respect to the next step in the process. The reel stand 29 may correspond to the reel stand 2 and may be of similar pattern. The strip 9 is then led from the reel 26 on the reel stand 29 through a warming heater 31, which may be similar to the drier 23, but smaller in size, since only a small amount of warming is desirable. The heater 31 may consist of a cabinet 32 and heater element 33, which may be closely similar to the cabinet 24 and heater 25.

From the heater 31, if the strip is re-reeled, or directly from the drier 23 if the strip is not re-reeled, it is led to a printing press 34. The press 34 is desirably one of the various types of "offset" process, which is preferably equipped to print upon both sides of the strip 9. The press is shown diagrammatically only and the details may be those which are suitable for the service proposed, which are well known and easily understood by those skilled in the art of printing presses, and particularly "offset" process of lithographing upon metal. Broadly, the press may consist of a pair of blanket rolls 35 and 36, which are desirably faced with rubber transfer blankets. Design printing rolls 37 and 38 are provided, running in contact with the blanket rolls 35 and 36, geared thereto in the usual way to avoid displacement and the resultant smudging, and sets of inking rollers 39 and 40, as indicated.

At the present time we find it convenient to produce the filter washers or discs of our invention each with spacing projections upon one side only, so that each washer has spacing projections to separate it from the next adjacent washer and it, in turn, is separated from the preceding washer by the projections thereon. This, we find desirable because of the factors involved in the punching and threading of the washers, although equally satisfactory results are obtained by placing the spacing projections upon both sides of alternate washers and threading alternately plated and unplated washers upon the filter spindle, as disclosed in the previously mentioned copending application. We find that while the application of the spacing projections to both sides of the alternate spacing washers requires the passage of but half of the material through the plating bath, the difficulty of interleaving the plated and unplated washers is greater than the saving obtained by applying the plating to half only of the strip material. Accordingly we prefer to apply the spacing projections to one side only of the strip.

We, therefore, apply a substantially continuous film of the non-conducting ink to one side of the strip, which may be done by the rolls 35 and 37, the type roll 37 being a plain, smooth roll without pattern thereon. If the unbroken film is applied by the roll 35, a film having openings at the points at which the spacing projections are to be applied is imprinted by the other blanket roll 36, and accordingly the type roll 38 is formed with the appropriate design. By this construction, the strip 9 is delivered from the printing press 35 with a film of ink upon each side, one of which is substantially continuous and the other of which has openings at the desired points. If desired, narrow margins on the edges of the strip may be left clear, for making better electrical contact to the strip.

From the printing press 34, the strip 9 is led to a drier 35, which may comprise a warmed room, not shown, within which a plurality of chains 36 are traversed at a slow rate of speed by suitable power means, upon which the strip 9 is properly festooned over suitable festooning rods 37. This may be done by automatic means, or may be done by hand. At the conclusion of the drying operation, the strip is ready for the plating operation. As before, the strip may be led directly to the next step, from the drier 35 to a plating tank 42.

The plating tank 42 may comprise a vat 43, in which anodes 44 are positioned upon suitable supports. Guide rolls 45 and 46 are desirably positioned within the vat 43 as shown in our copending application, Serial #197,782, filed June 10, 1927, and guide rolls 47 and 48 are positioned above the surface of the electrolyte. A generator 49 is provided and the positive terminal thereof connected to the anode 44. The negative terminal is suitably connected to the strip 9, thereby making it cathode, but in this instance in an electrolyte containing a metal salt, so that a platable metal is deposited.

The connection from the generator 49 to the strip 9 may be made through the rolls 47 and 48 as indicated in the above mentioned copending application, or may be made through connection means 51, comprising sole plate, guide rolls, and drag links similar to the connector members 11, shown and described in connection with the cleaning tank 3.

The vat 43 contains an electrolyte 52, which may desirably comprise a slightly acid solution of copper sulphate. It has been found convenient to utilize copper for the spacing projections on the filter discs, partly because of the ease and convenience of deposition thereof. It is not, however, necessary that copper be used, since other metals are equally usable. Accordingly, if other metals are to be deposited other electrolytes will be used.

The strip 9 is desirably traversed through the plating bath by power from any convenient source applied in any convenient way, as by a belt to the wringer rolls 61. It is essential that the speed of passage of the strip 9 through the plating bath be accurately controlled since the speed of travel is one of the factors which controls the height of the plated spacing projections. The other factor in the determination of the height of the projection is the current density. This, however, is to some extent fixed by the characteristics and composition of the bath and by the fact that with certain current densities it is possible to deposit a coherent layer of metal within the larger openings and to deposit a granular, pulverulent deposit at the pin holes and small openings through the ink film, which occur on both sides of the strip. It is desirable that this property of the plating bath be utilized, in order to avoid the occurrence of projections at undersired places and to avoid the possibility of the reduction in the available filter area by the presence of such projections.

By adjustment of the current density, and the speed of travel of the strip, the heights of the spacing projections are readily controlled to a desired uniform value. The height is conveniently less than the thickness of the sheet stock, and may desirably be less than one one-thousandth of an inch (0.001″) for most satisfactory filtration. A convenient speed of travel for the strip has been found to be 2.13 feet per minute, which is suitable for the particular current density provided by the generator used. It is, however, equally satisfactory to use a higher current, and faster speed of travel of the strip, in which case the bath concentration is also desirably raised as long as undue heating does not occur.

From the plating tank 42, the strip 9, is desirably led to another rinser 54. This may consist of a vat 55, which may be similar to the vat 16 and may contain a roller 56 similar to the roll 17 and may contain a water spray 57 connected by a pipe and valve 58 to a supply of clear water, and may be equipped with a drain 59 as before. Wringer rolls 61, as before, are desirably provided to remove the excess fluid and draw the strip 9 through the baths.

After the plating operation, it is essential that the ink film be removed, which is conveniently done by a second application of the cathodic cleaning process. As before, the strip 9 may be led directly from the washer 54, to the cleaning operation, or the strip, with both the ink film and plated spacing projections, may again be re-reeled upon a reel 62 having a standard 63 and a power supply 64, similar to the reels 26 and 37 and stands 27 and 38. The reel may then be transferred directly, or after temporary storage, to a fourth reel stand 65 similar to reel stands 2, 29, and 41.

The strip 9 may be led from the reel 62 on reel stand 65, or directly from the wringer rolls 61 on vat 54, to a cathodic cleaning bath 66. This may be a duplicate of the cleaning bath 3 or may be the same cleaning bath, as well as any other suitable form of cleaning device. It has been found convenient to traverse the strip 9 through the cleaning bath 3 at a speed double or more than double the speed at which it is convenient to pass it through the plating bath 44. Accordingly it is readily convenient to clean an unplated roll of strip and a plated roll of strip alternately by passage through the cathode cleaning vat, thereby reducing the number of vats and the number of generators required. Since the vat 66 shown is identical in construction with the vat 3, similar reference numerals are applied thereto and similar functions are performed therein, for the removal of the ink film from the strip 9, and from about the plated spacing projections. After removal of the ink film in the vat 66, the strip 9 is conveyed to a rinser 67, which may be identical with the washer 15, and if the cleaning vat 66 is the same vat as is used for the cleaning step in vat 3, vat 67 will be the same as the vat 15. Accordingly similar reference numerals are applied and a similar function is served for the removal of traces of soda cleaning compound. After washing in the vat 67, the strip may be led to a drier 68, which may be identical with the drier 23 and perform similar functions in the drying of the plated strip, as for the drying of the unplated strip. After drying, the strip may be re-reeled on a reel 69 supported on a standard 70 and actuated by power through a belt 71, these elements corresponding to the reel 26, etc., and stands 27 and 38 etc., and performing similar functions.

It is not essential that the dried strip from the drier 68 be rolled. It may, instead, be led directly to the following operation, which is that of punching out the washers.

If the strip is reeled, the reel 69 may be transferred directly, or after temporary storage, to a reel stand 72, which is similar to and corresponding to the previously described reel stands 2, 41, and 65.

From the reel stand 72, or directly from the drier 68, the strip 9 is led to a punch press 73. This press is desirably a multiple gang press having dies which perforate the openings for the washer centers at the first step, and punch out the washers at a second step. The washers are desirably about two inches (2") in diameter with an opening which is desirably about one and three sixteenth inches ($1\frac{3}{16}$") in diameter. They are accordingly desirably punched in rows of threes across the width of the strip. The washer centers may be punched through the dies and discharged through bottom openings into a suitable container from which they may be removed as scrap, or to such other uses as may appear. The finished washers are desirably likewise punched through the dies and delivered to spindles 74 positioned below the die, from which they are removed at convenient intervals. The punch is desirably designed to operate continuously and is desirably provided with indexing means, such that the perforations for the centers of the washers are centered over the openings of the larger dies with reasonable accuracy. This indexing means will not here be described in detail since it is a simple adaptation of a well known apparatus, which is well known to those skilled in the art.

From the spindles 74, the washers are desirably transferred to the spindles upon which they will be used. These spindles are desirably provided with channels for the flow of fluid, as described in the previously mentioned application, and are desirably provided with a fixed head and with a threaded end, upon which a compression nut may be screwed to squeeze them together, and reduce and equalize the space between the washers. The washers upon the final spindle are desirably treated by appropriate means, as by laying them within a V before they are compressed so as to adjust the outer edges into a uniform cylindrical surface.

After the truing up, the spindle may be tested by forcing oil from a convenient pressure source into the passages to fill the interstices, and watching for any obvious large spurts or streams. If no obviously large spurts appear, air pressure may be applied to the interior, whereupon any unduly large interstices are indicated by a substantial stream of air bubbles. If defective washers are disclosed by these tests, the stack may be removed from the spindle and the defective washers taken out. If no defects occur, the spindle may be drained, packed, and sent to storage for shipment.

By this system of our invention, we are enabled to produce the washers with spacing projections, for assembly into the filter units by a simple, convenient, rapid and inexpensive manufacturing operation, which comprises a series of steps in a new and useful sequence which produce a new and useful result. As completed in the system of our invention, the succession of steps is such that the raw material enters at one end of the process, and travels through it smoothly, rapidly and simply to emerge at the end of the sequence as the finished product.

While we have shown but a single embodiment of our invention in the preceding description, it is capable of various modifications therefrom without departing from the spirit thereof, and it is desired therefore that only such limitations shall be placed thereon as are required by the prior art or indicated by the appended claim.

We claim as our invention:

A device for the production of filter elements comprising means for the traversing of an elongated metal strip, and a plurality of devices adapted to operate upon a traversable strip simultaneously and in sequence upon different portions thereof, comprising a cleaning device, a drying device, means for applying a tenuous, discontinuous nonconducting film upon the strip, a plating bath, a second cleaning device, and means for forming the strip into more complicated shapes by severance of portions thereof from the strip.

In witness whereof, we hereunto subscribe our signatures.

WALDO L. KRAEMER.
ALVIN C. PURDY.